US012761057B2

(12) United States Patent
Doran et al.

(10) Patent No.: US 12,761,057 B2
(45) Date of Patent: Oct. 13, 2026

(54) STRAIN SENSING

(71) Applicant: Hewlett-Packard Development Company, L.P., Spring, TX (US)

(72) Inventors: John Doran, Sant Cugat del Valles (ES); Miguel Angel Alegre Lopez, Sant Cugat del Valles (ES); Richard Mckinney, Sant Cugat del Valles (ES); Jose Francisco Bravo De Vega, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 358 days.

(21) Appl. No.: 18/292,819

(22) PCT Filed: Jul. 29, 2021

(86) PCT No.: PCT/US2021/043779
§ 371 (c)(1),
(2) Date: Jan. 26, 2024

(87) PCT Pub. No.: WO2023/009129
PCT Pub. Date: Feb. 2, 2023

(65) Prior Publication Data
US 2024/0271983 A1 Aug. 15, 2024

(51) Int. Cl.
*G01F 23/20* (2006.01)
*B41F 31/02* (2006.01)
(Continued)

(52) U.S. Cl.
CPC .......... *G01F 23/20* (2013.01); *B41J 2/17566* (2013.01); *B41F 31/022* (2013.01);
(Continued)

(58) Field of Classification Search
CPC ... G01F 23/20; B41J 2/17566; B41J 2/17553; B41J 2002/17579; B41J 2/17513; B41F 31/022; B41L 27/04
(Continued)

(56) References Cited

U.S. PATENT DOCUMENTS 5,731,824 A * 3/1998 Kneezel ................. G01G 17/06 347/7
6,793,331 B2 * 9/2004 Anderson ............ B41J 2/17566 347/7
(Continued)

FOREIGN PATENT DOCUMENTS

DE 102014224324 A1 6/2016
JP 09-183237 A 7/1997
(Continued)

*Primary Examiner* — Peter J Macchiarolo
*Assistant Examiner* — John M Royston
(74) *Attorney, Agent, or Firm* — Jordan IP Law, LLC

(57) ABSTRACT

An example support for a fluid container is described, comprising a bracket comprising a U-shaped cross section and a strain gauge attached on a web of the U-shaped cross section of the bracket, between a mounting portion for attaching the bracket to a printing apparatus and a bearing portion for attaching a fluid container to the bracket. An example method for determining the amount of fluid in a container is also described, comprising measuring with a strain gauge a strain occurring at the web of a U-shaped bracket, the U-shaped bracket having a wing for attachment to a printing apparatus and a wing for carrying a fluid container; and determining the amount of fluid in the fluid container based on the measured strain.

15 Claims, 6 Drawing Sheets

(51) Int. Cl.

| | |
|---|---|
| ***B41J 2/175*** | (2006.01) |
| ***B41L 27/04*** | (2006.01) |
| ***G01G 17/04*** | (2006.01) |
| ***G01G 21/22*** | (2006.01) |

(52) U.S. Cl.
CPC ........ *B41J 2/17513* (2013.01); *B41J 2/17553* (2013.01); *B41J 2002/17579* (2013.01); *B41L 27/04* (2013.01); *G01G 17/04* (2013.01); *G01G 21/22* (2013.01)

(58) Field of Classification Search
USPC ........................................................... 73/296
See application file for complete search history.

(56) References Cited

U.S. PATENT DOCUMENTS

| | | | |
|---|---|---|---|
| 8,065,913 | B2 | 11/2011 | Mccracken et al. |
| 8,678,567 | B2 | 3/2014 | Shimizu et al. |
| 2007/0002086 | A1 | 1/2007 | Jung et al. |
| 2018/0281428 | A1 | 10/2018 | Esterberg et al. |

FOREIGN PATENT DOCUMENTS

| | | | | |
|---|---|---|---|---|
| RU | 1809317 | A1 | | 4/1993 |
| RU | 78926 | U1 | * | 12/2008 |
| WO | 2013/064418 | A1 | | 5/2013 |

* cited by examiner

STRAIN SENSING

BACKGROUND

Inkjet printers and other apparatus that use a fluid during operation may comprise a fluid container attached to a support in the apparatus, for example removably attached to the support. The amount of fluid in such a fluid container may be monitored during operation, for example to obtain data on the fluid consumption, and/or to issue a warning when it is convenient to change the container, and/or for maintenance or other purposes.

BRIEF DESCRIPTION

Some non-limiting examples of the present disclosure will be described in the following with reference to the appended drawings, in which.

Figure 3A:
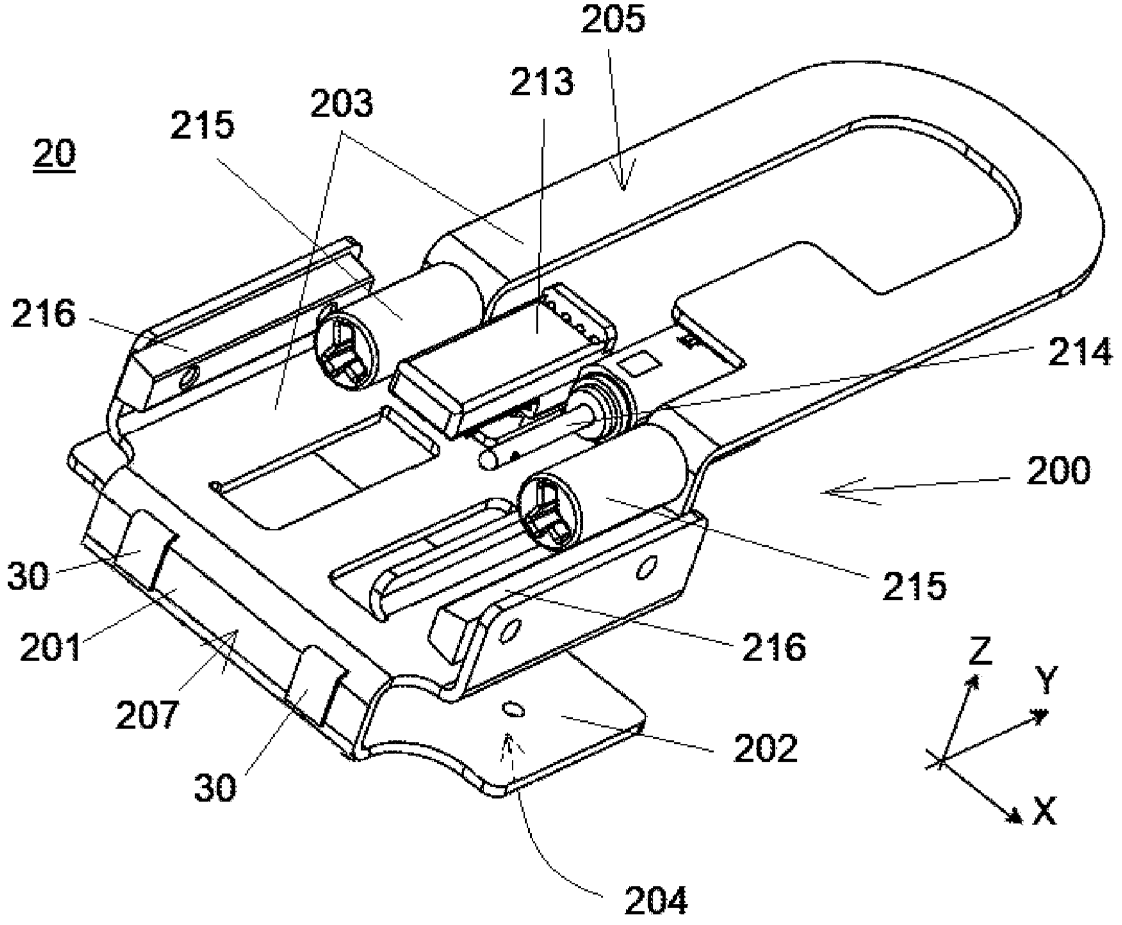
Figure 3B:
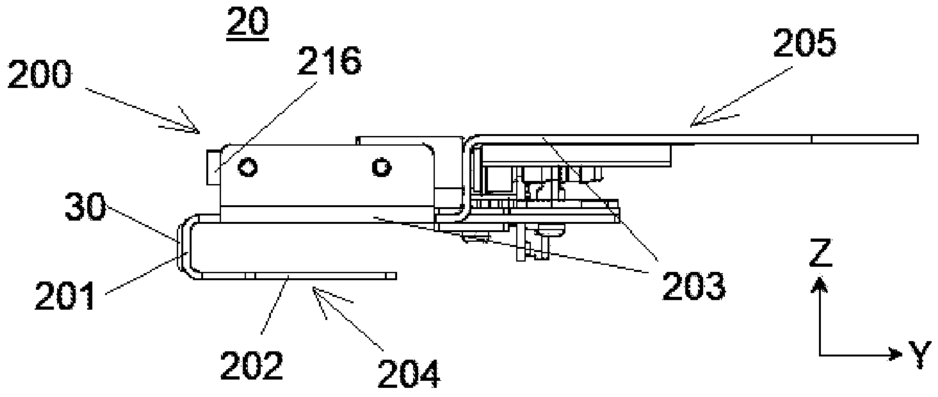

FIG. 3*a* is a schematic perspective view of an example support for a fluid container for a printing apparatus, according to implementations disclosed herein;

FIG. 3*b* is a side view of the example support of FIG. 3*a;*

Figure 4:
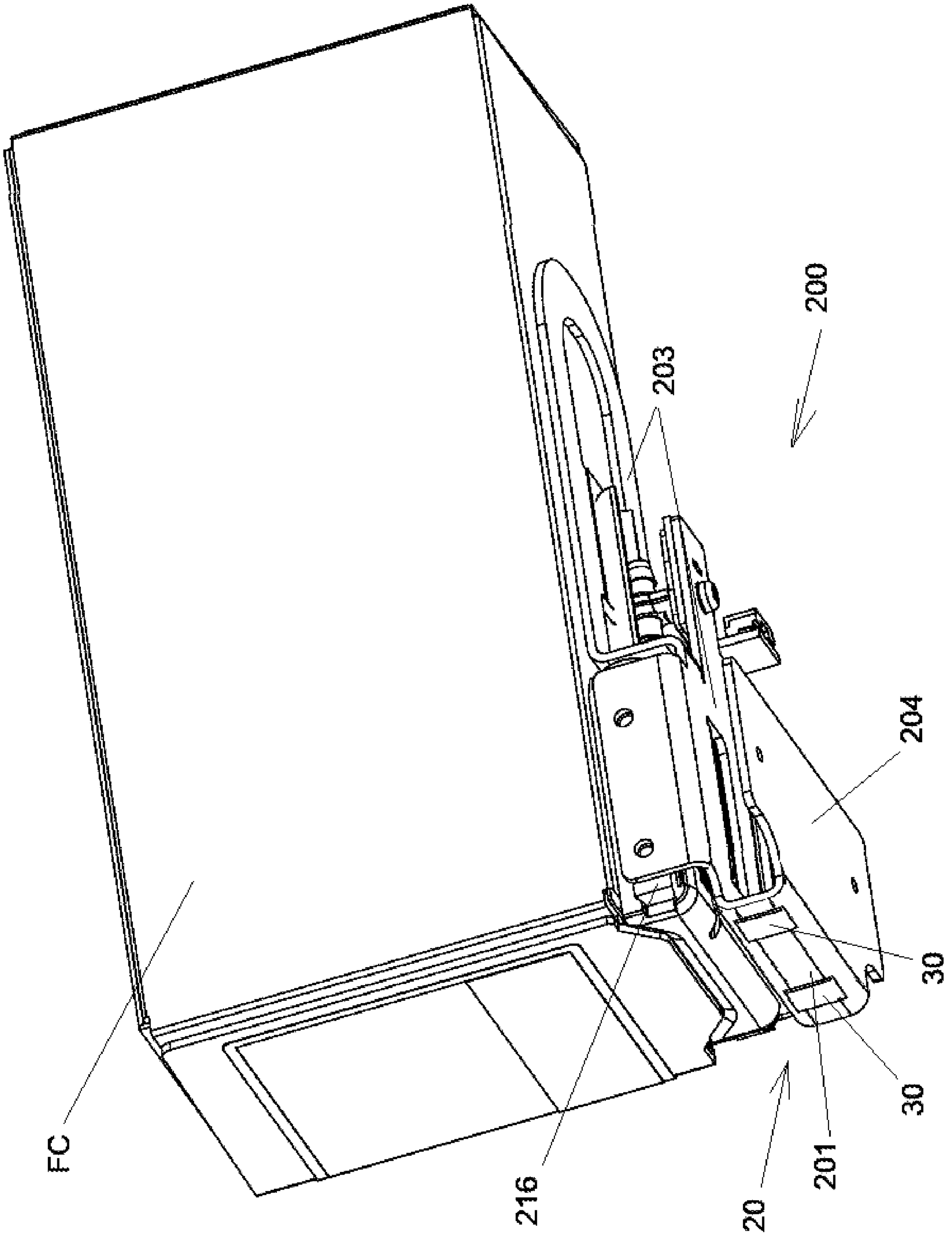
Figure 5:
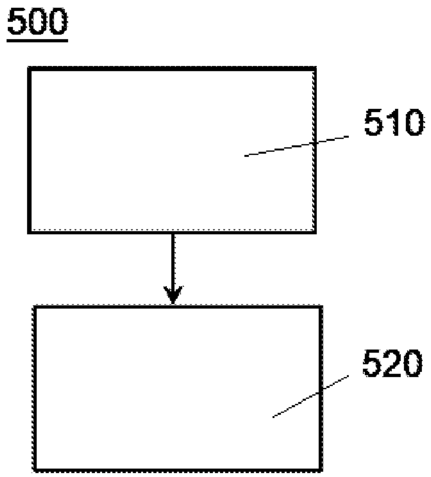
Figure 6:
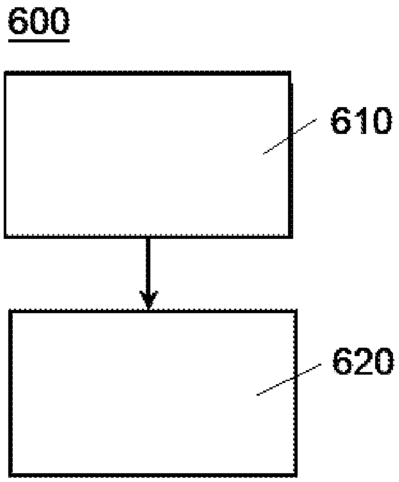
Figure 7:
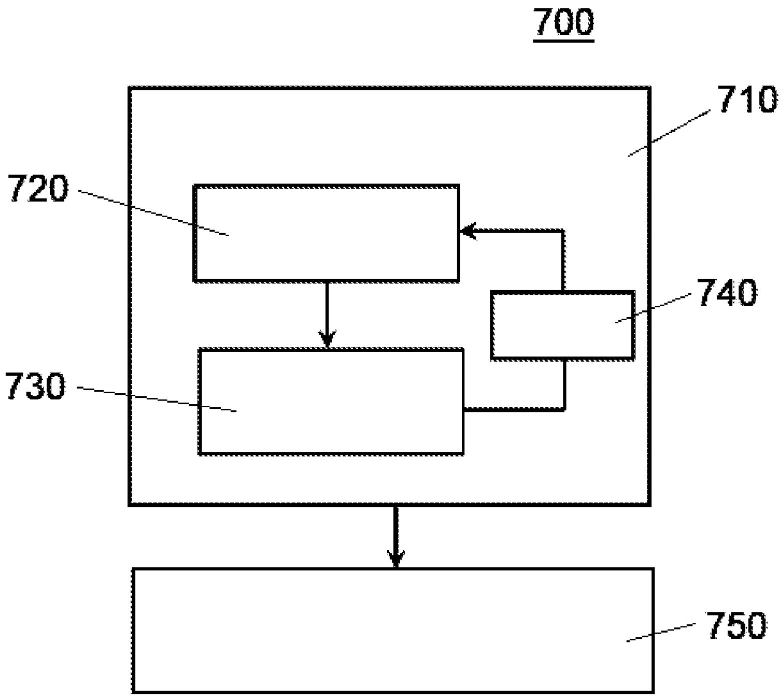
Figure 8A:
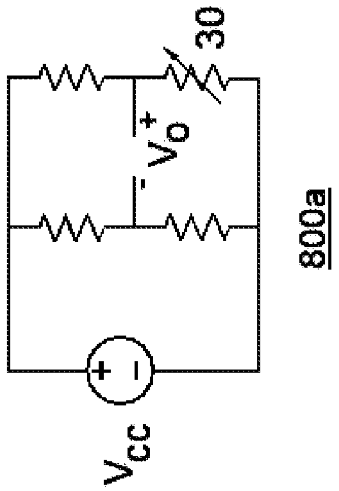
Figure 8B:
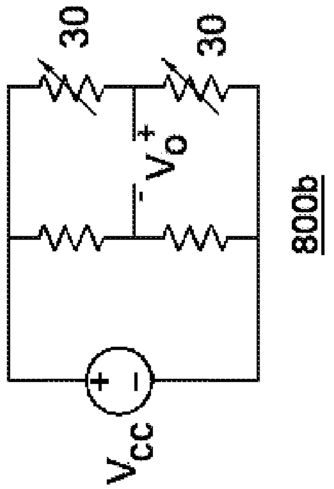
Figure 8C:
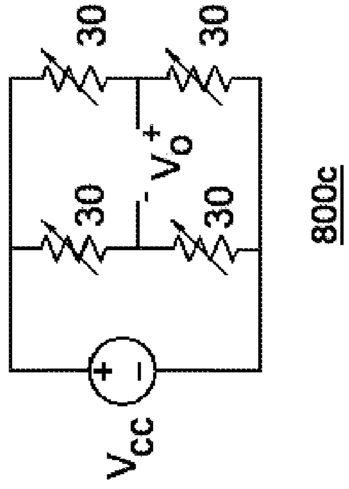
Figure 9:
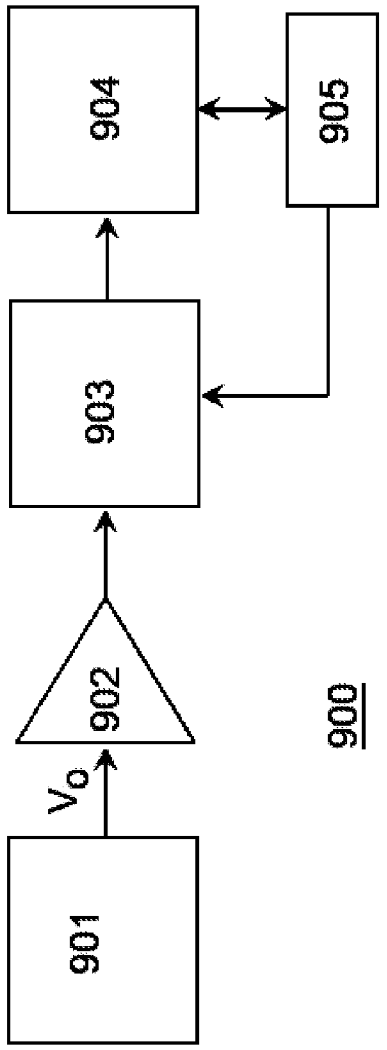
Figure 10:
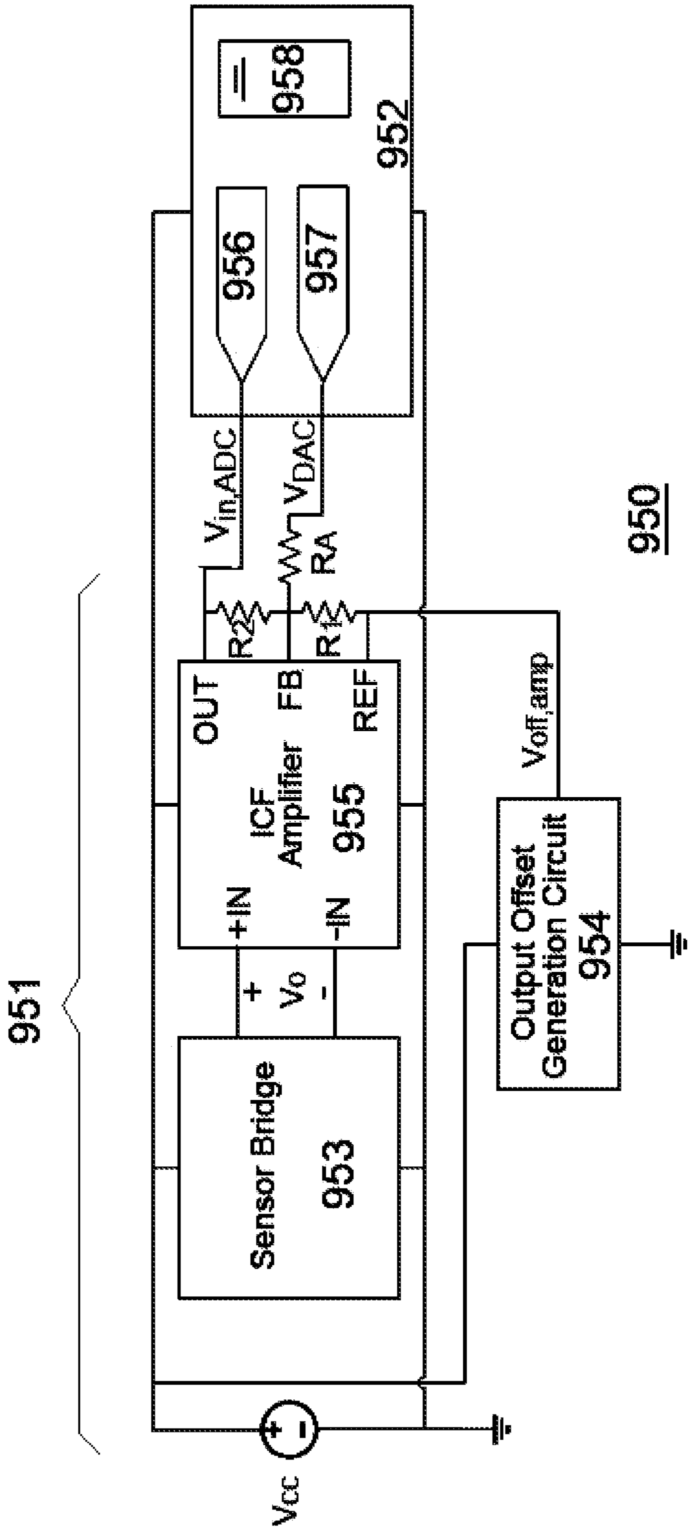

FIG. 4 is a schematic perspective view from below of an example support according to implementations disclosed herein, with a fluid container attached to the support;

FIGS. 5, 6, 7 are block diagrams of example methods according to the present disclosure;

FIGS. 8*a*, 8*b* and 8*c* are diagrams of example sensor bridges in which example gauge strains according to the present disclosure may be connected;

FIG. 9 is a very schematic block diagram of an example measuring system according to the present disclosure; and FIG. 10 is a block diagram of an example measurement circuit according to the present disclosure.

DETAILED DESCRIPTION

Inkjet printers and other apparatus that use a fluid during operation may comprise a fluid container, for example a supply of printing fluid, a tank for waste print fluid, or other. The amount of fluid present in a fluid container and/or the amount of fluid consumed in a print job or in a servicing operation are sometimes estimated based on drop counting, e.g. recording the expected size and frequency of fluid jetted drops during printing and servicing events: however, the accuracy of this measurement method is poor. In other methods, the fluid container is removed from the printer and weighed on a standalone scale, which is time consuming and involves manual intervention; it may also cause undesired effects on the fluid supply system itself, such as intake of air, wear of some components, and other.

It is hereby proposed to estimate the amount of ink in an ink container by attaching a strain gauge to a component associated with the ink container. In the present case, ink amount accuracy is improved due to its construction design and, in particular, the position of the strain gauge within the construction design.

The present disclosure relates to determining the amount of fluid or level of fluid in a fluid container, for example a fluid container associated with a printing apparatus.

Improved estimates of the amount of fluid in a fluid container may be obtained by mounting the fluid container, e.g. in a printing apparatus, using a support according to examples of the present disclosure. Such a support for a fluid container may comprise a U-shaped bracket, i.e., a bracket with a substantially U-shaped cross section, and a strain gauge attached to a web of the U-shaped bracket.

Examples of printing apparatus which may comprise supports for fluid containers and/or may implement methods according to examples disclosed herein may be, amongst others, printers using printing fluids for thermal or piezo-electric inkjet technology, or others; 3D printers with nozzles to release fluid agents on a build material. Fluids contained in a fluid container may include latex printing fluids, solvent-based printing fluids or others, as well as fusing agents and other substances used in 3D printing, such as binding agents, detailing agents, or others.

For clarity reasons, not all the elements of the example supports and systems are illustrated in the drawings. Furthermore, the drawings are generally schematic and may not be to scale, thus not defining the precise proportions of the illustrated elements.

Figure 1:
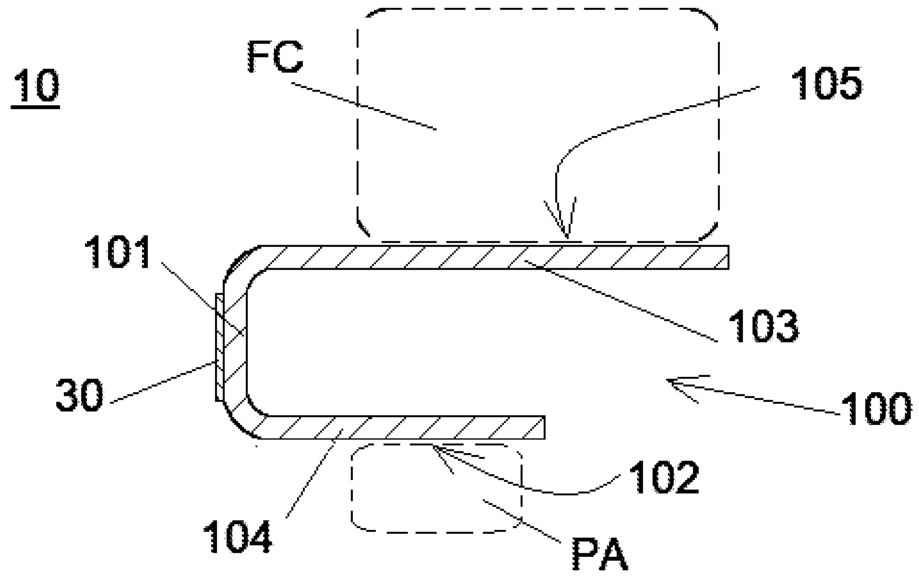
FIG. 1 is a schematic cross section view of an example support for a fluid container for a printing apparatus, according to implementations disclosed herein.

In FIG. 1, a support 10 according to examples of the present disclosure may comprise a bracket 100 with a substantially U-shaped cross section, i.e., a cross section with a web 101 and two wings 102, 103, with each of the wings 102 and 103 extending from one of the ends of the web 101, and with both wings 102, 103 extending towards the same side of the web 101. The web 101 and the two wings 102, 103 have a width dimension in a width direction, substantially perpendicular to the plane of the U-shaped cross section (i.e., perpendicular to the plane of the drawing in FIG. 1).

In some examples, each of web 101, wing 102 and wing 103 may have different widths in the width direction, and wings 102 and 103 may have different lengths. In some examples, one or both wings 102, 103 may be substantially perpendicular to the web 101; in other examples, one or both wings 102, 103 may form angles of between 60° and 130° with the web 101.

A mounting portion 104 may be defined on wing 102 of the bracket 100, for attaching the bracket 100 to a printing apparatus PA, e.g. to a stationary supporting frame of the printing apparatus. A bearing portion 105 may be defined on the other wing 103 of the bracket 100, for attaching, for example for removably attaching, a fluid container FC to the bracket 100. The bracket 100 may be shaped such that once it is in operating position in the printing apparatus PA, i.e., with the mounting portion 104 attached to the frame of the printing apparatus, the bearing portion 105 of the bracket is substantially horizontal.

In some examples, the wing 103 of the bracket on which the bearing portion 105 is provided is intended to extend in a substantially horizontal plane, and to be the upper wing of the bracket 100, once the support 10 is in working position in a printing apparatus.

The mounting portion 104 and the bearing portion 105 of the bracket 100 may each comprise suitable attachment features such as mounting holes or grooves, snap fit joints, guides, and/or others. Once the bracket 100 is mounted in the printing apparatus PA and the fluid container FC is attached to the bracket 100, the space between the wings 102 and 103 may remain substantially free.

In some examples of the present disclosure, a strain gauge 30 is attached to the web 101 of the bracket 100, between the mounting portion 104 and the bearing portion 105.

When the bracket 100 is attached to the frame of the printing apparatus PA, and a fluid container FC is attached to the bearing portion 105, the weight of the fluid container exerts a force on the wing 103 that tends to deform the bracket 100 and in particular the web 101. This causes a strain on the web 101, that is proportional to the force applied on the bracket, i.e., to the weight of the fluid container FC. As fluid is consumed during operation and exits the fluid container FC, the strain on the strain gauge 30 decreases, and therefore the reading of the strain gauge 30 decreases proportionally.

As a consequence of the U-shaped geometry of the bracket 100 and the positioning of the fluid container FC on the bearing portion 105 of the bracket 100, strain due to the weight of the fluid container FC concentrates on the web 101 of the bracket 100. The arrangement of a strain gauge 30 on the web 101 thus allows obtaining accurate readings of the strain on the web 101, and therefore accurate measurements of the weight of the fluid container.

In some implementations, the distance between the bearing portion 105 and the web 101 of the bracket may be greater than the distance between the mounting portion 104 and the web 101. For example, the distance between a central point of the bearing portion 105 and the web 101 may be greater than the distance between a central point of the mounting portion 104 and the web 101, with the central points being defined as the points of the bearing and mounting portions where the respective loads are centred. This may increase the torque exerted by the weight of the fluid container FC on the web, and therefore the strain to which the web 101 is subjected, so that the readings of strain gauge 30 may be increased for a given weight of the fluid container FC.

In some examples, a strain gauge 30 may be positioned substantially in the centre, in the width direction, of the web 101. Such a central position of the strain gauge 30 may be useful to reduce the influence on the strain gauge of a twisting strain to which the web 101 may be subject: the strain gauge readings may therefore be more accurately correlated to the strain caused on the web 101 by the weight of the fluid container FC.

As shown e.g. in FIG. 1, in some examples the strain gauge 30 may be attached on the outer side of the web 101, i.e., on the convex side of the U-shaped bracket 100.

The strain gauge 30 may be oriented on the web 101 in such a way to be subject in particular to deformation and strain occurring in the direction perpendicular to the width direction of the web 101, i.e., the direction extending from one wing 102 to the other wing 103 in the U-shaped cross section, as strain in this direction is substantially related to the load exerted by the weight of the fluid container FC.

In some examples, more than one strain gauge 30 may be attached to the bracket 100, e.g. on the outer surface of the web 101.

In some examples, the amount of fluid or the level of fluid in the fluid container FC may be determined based on the measured weight of the fluid container, i.e., based on readings provided by the strain gauge 30.

For instance, a controller 40 may use the output of the strain gauge 30 to determine the amount of fluid in the container FC, taking into account also the weight of the empty container, and/or the weight of the full container, and/or the kind of fluid, and/or density of the fluid, and/or the temperature in the printing apparatus, and/or other parameters.

Since the determination of the amount of fluid is based on an accurate measurement of the weight of the fluid container, the amount of fluid may also be accurately determined. Furthermore, the determination of the amount of fluid in the fluid container may be performed at any time, e.g. programmed and automatically executed by the controller, without manual intervention of an operator and without involving down times.

The amount of fluid may be determined at predetermined intervals, e.g. in order to issue an alert when the amount of fluid falls below a predetermined threshold, or when the amount of fluid raises above a predetermined threshold in the case of a fluid container of a service station that received waste fluid; it may be determined before, during or after the operation of the printing apparatus, e.g. before a print job to estimate if there is enough fluid to complete a desired print job, or both before and after a print job, to obtain an estimate of the amount of fluid employed in that job.

In some examples, the amount or level of fluid in the fluid container FC may be determined in any circumstance where it is deemed useful to obtain such information, for example for print fluid management or printing fluid accounting purposes. Accurately monitoring the amount of fluid over time may also allow detecting unusual fluid consumption from the fluid container, indicating a potential leak or other issue.

Implementations of a support for a fluid container according to the disclosure may be employed e.g. for print fluid containers supplying fluid to inkjet printheads or other printing systems, and/or for fluid containers intended to receive fluid discarded for maintenance purposes, such as waste print fluid tanks, and/or for other fluid containers, e.g. intermediate fluid containers that may be used in the apparatus. In each case, the fluid container may be e.g. removably attached to the U-shaped bracket, to be replaced when depleted (or when full, in the case of a waste fluid container), or the fluid container may be permanently attached to the U-shaped bracket, e.g. to be refilled when convenient.

In some implementations, e.g. when printing fluids of different colours and/or types are employed, several example supports as disclosed herein may be provided in a printing apparatus, each provided with a U-shaped bracket and a strain gauge, and with a fluid container being attached to each support, e.g. fluid containers containing print fluids of different colours.

Strain gauge 30 is a sensing element that, under the load caused by the weight of the fluid container FC, deforms and changes its electrical resistance, in proportion to the mechanical strain of the web 101 of the bracket 100.

In some implementations, strain gauge 30 may be a foil strain gauge, comprising an insulating flexible backing which supports a conductive foil pattern, e.g. a metallic foil pattern. In some examples, the foil strain gauge may be attached to the web 101 using a suitable adhesive, such as epoxy or others.

In some examples the conductive foil pattern of strain gauge 30 may comprise a plurality of thin parallel tracks connected in series between two connection terminals. Such a strain gauge 30 may be oriented on the web 101 with the parallel tracks extending in the direction perpendicular to the width direction of the web 101, i.e., the direction extending between one wing 102 and the other wing 103 in the U-shaped cross section. The strain gauge 30 thus may sense the strain in this direction, which is caused by the weight of the fluid container FC.

In some implementations, strain gauges 30 may extend a distance beyond the web 101 e.g. towards the bearing portion 105 and/or towards the mounting portion 104, so as to be subject to strain at one or at both bends of the bracket 100.

In example supports 10 according to the present disclosure, the bracket 100 may be an integral part, e.g. formed by a bent metal sheet, such that irregularities in the properties of the bracket due e.g. to assembly of different components, may be reduced. The strain to which the web 101 is subject may therefore be more uniform: this may prevent, for instance, a high degree of twisting of the web 101 in the direction of the width.

In some examples, the web 101 and/or the wings 102, 103 of the bracket 100 may have cut outs of different shapes and sizes, e.g. for a higher concentration of the strain of the web 101 in some areas, where the strain gauges 30 may be attached.

In some examples, and as explained in more detail later on, one or more strain gauges 30 may be connected in a Wheatstone bridge configuration in order to measure the change of resistance and therefore the strain in the web 101 of the bracket 100, to which the strain gauges 30 are subject. An excitation voltage may be applied to input leads of the Wheatstone bridge and a voltage reading may be taken from output leads of the Wheatstone bridge, related to the resistance of the strain gauge 30 and therefore related to the strain of the web of the bracket and to the weight of the fluid container. For increased accuracy in the determination of the amount of fluid in the fluid container, an electronic circuit may be provided to amplify the output of the Wheatstone bridge, as explained in more detail later on.

Also, according to examples of the present disclosure, a fluid level sensor 50 may be provided, e.g. to measure the fluid level, or the fluid amount, in a fluid container. As illustrated e.g. by FIG. 2, examples of a fluid level sensor 50 may comprise a bracket, e.g. such as bracket 100 of FIG. 1, with a U-shaped cross section formed by two wings 102, 103 and a web 101 between them, and with one of the wing comprising a bearing portion 105 for attaching a fluid container FC. The fluid sensor 50 may also comprise a strain sensor, such as for example a strain gauge 30 as described above in relation to FIG. 1, attached to the web 101 of the bracket 100 to sense a strain of the web 101 caused by the weight of a fluid container FC that may be attached to the bearing portion 105 of the bracket 100. The fluid sensor 50 may also comprise a controller 40, to correlate the strain of the web, as sensed by the strain sensor, to a fluid level in the fluid container FC.

Implementations of fluid level sensors according to the present disclosure may combine different brackets, strain gauges and controllers as described in any of the examples herein.

Examples of supports and/or examples of fluid level sensors according to the present disclosure may be applied, inter alia, to a printing apparatus, e.g. to an inkjet printing apparatus. For example, such supports or fluid level sensors may be used for fluid containers of a printing apparatus, such as print fluid containers for supplying print fluid for a print job, tanks for collecting waste print fluid, or others.

Example supports 10 and example fluid level sensors 50 may be mounted in a printing apparatus e.g. by attaching the bracket 100 to a stationary frame of the printer and/or to a print fluid supply station, a printhead service station, or other, with the web 101 and bearing portion 105 of the bracket 100 positioned so that the weight of a fluid container FC attached on the bearing portion 105 causes a load and consequent strain on the web 101.

FIGS. 3*a* and 3*b* illustrate, in perspective view and side view respectively, an example of a support 20 for a fluid container for a printing apparatus, according to implementations of the present disclosure. Example support 20 may comprise a bracket 200 with a substantially U-shaped cross section, with a web 201 and two wings 202, 203.

Wing 202 of the bracket 200 extends from one end of the web 201 and comprises a mounting portion 204 for allowing the assembly of the bracket 200 on a support frame of a printing apparatus (not shown).

Wing 203 of the bracket 200 extends from another end of the web 201 and comprises a bearing portion 205 for attaching and supporting a fluid container (not shown in FIGS. 3*a*, 3*b*) on the bracket 200.

Each of the web 201 and the two wings 202, 203 have a width dimension in a width direction, i.e., the X direction in FIG. 3*a*, substantially perpendicular to the plane YZ of the U-shaped cross section of the bracket 200.

In some examples, the wings 202, 203, e.g. wing 203 in FIGS. 3*a* and 3*b*, may be shaped with some bent sections and/or openings and/or other details. For instance, in some examples the wing 203 may comprise or receive some other elements, which will be described below, intended to cooperate with the fluid container. FIG. 4 illustrates, in a perspective view seen from below, an example support 20 with a fluid container FC attached on the bearing portion 105.

Example brackets 200, e.g. as illustrated in FIGS. 3*a*, 3*b* and 4, are generally U-shaped, as both wings 202, 203 extend from the web 201 in the same general direction (Y direction in FIG. 3*a*), which may be a direction substantially perpendicular to the plane XZ of the web. In some examples, each wing 202, 203 may extend at a different angle from the web 201. Wings 202 and 203 may have the same length or different lengths in the Y direction (length direction) of FIG. 3*a*.

In the example support 20, two strain gauges 30 are attached to the bracket 200, e.g. on an outer surface 207 of the web 201 as illustrated.

In some implementations of the present disclosure, one, two or four strain gauges 30 may be attached to the bracket 200, e.g. on the outer surface 207 of the web 201. In other examples, a different number of strain gauges 30 may be used.

In some examples in which two strain gauges are used, attached to the web of a bracket 100 or 200, each strain gauge 30 may be a foil strain gauge, oriented as described above in relation with FIG. 1. In some examples, two strain gauges 30 may be parallel to each other and spaced apart along the X direction, arranged symmetrically with respect to the centre of the web in this X direction. In some examples, the distance between the two strain gauges 30 may be at least 30% of the total width of the web 201, i.e., of the dimension of the web 201 in the X direction.

In some implementations in which four strain gauges 30 are used, for instance four foil strain gauges, two of the four strain gauges may be attached to the web 101 or 201, e.g. as in a two-gauge implementation as described in the previous paragraph; for instance, they may be attached to the outer surface 207 of the web. In some examples, the two additional strain gauges 30 may also be attached to the web 101 or 201 and, in some examples, they may be attached to the inner surface of the web. For instance, they may be placed in a mirror position with respect to the two strain gauges 30 positioned on the outer surface of the web, as this mirror position may allow a better balancing of the readings.

In some implementations, in order to increase the accuracy of the determination of the amount of fluid in the container, a simulation based on Finite Element Analysis (FEA) may be carried out for a particular design of the bracket or for a particular bracket, to determine the zones of the web which undergo a relevant degree of strain caused by the weight of the fluid container. The position of strain gauges may thus be tailored such that the strain they undergo, and the measurement they provide, is closely related to the weight of the fluid container.

In some examples, a support 20 for a fluid container FC may comprise additional elements intended to cooperate with the fluid container FC, which may be provided on the wing 203 of the bracket 200, i.e., on the wing intended to be the upper wing once the support 20 is in working position in a printing apparatus.

For example, such as shown in FIGS. 3*a*, 3*b* and 4, an example support 20 for an example fluid container FC of print fluid to be supplied e.g. to inkjet printheads, may comprise an electrical interface 213 for the connection of connection pads (not shown) of the fluid container FC to a printing apparatus controller; a fluidic interface 214 with a needle and sealing humidor, intended to establish the fluid communication with the fluid in the fluid container through a pierceable seal (not shown) of the fluid container FC; mechanical keyed connections 215, with a geometrical shape intended to match complementary shapes (not shown) formed on the fluid container to prevent errors; and guides 216 to assist in the assembly of the fluid container FC on the bracket 200 and in the alignment of the components. Other example supports 20 may have different additional elements.

In some implementations, example brackets 100 or 200 disclosed above may be made of metal, e.g. aluminium, which may be useful in case of smaller fluid containers which exert relatively low loads on the bracket, or hardened steel, stainless steel, titanium, or others. Example brackets may also be made of non-metallic materials, e.g. plastics, or combinations of several materials.

Implementations of methods according to the present disclosure for determining the amount of fluid in a fluid container, e.g. in a printing apparatus, are described below. In some implementations, such example methods may be carried out using any example support for a fluid container disclosed herein.

FIG. 5 is a block diagram of an example method 500 for determining the amount of fluid in a fluid container FC. In some examples, the fluid container FC may be mounted on a support according to implementations disclosed herein, e.g. support 10 or support 20 of any of the above examples.

With reference to FIG. 5, an example method 500 for determining the amount of fluid in a fluid container comprises, at 510, measuring with a strain gauge a strain occurring at the web of a U-shaped bracket, the U shaped bracket having a first wing for attachment to a printing apparatus and a second wing for carrying a fluid container, the strain gauge being attached to the web of the U-shaped bracket; and, at 520, determining the amount of fluid in the fluid container based on the strain measured with the strain gauge.

The first wing and second wing may be the wings extending from the two ends of the web of the U-shaped bracket, e.g. as in example supports 10 or 20 disclosed above.

According to implementations of the present disclosure, a correlation may be established between the strain in the web of the bracket, as measured with the strain gauge, and the amount of fluid in the fluid container, by virtue of the geometry of the bracket and of the positioning of the strain gauge, which, as explained above, allow concentrating and measuring the strain caused on the bracket by the weight of the fluid container, and therefore by the amount of fluid in the fluid container.

As illustrated in FIG. 6, an example method 600 for determining the amount of fluid in a fluid container may comprise, at 610, measuring with a strain gauge a strain occurring at the web of a U-shaped bracket, the U shaped bracket having a first wing for attachment to a printing apparatus and a second wing for carrying a fluid container, the strain gauge being attached to the web of the U-shaped bracket; and, at 620, determining the amount of fluid in the fluid container based on the strain measured with the strain gauge and on additional parameters, e.g. parameters related to at least one of the fluid container and the fluid in the fluid container.

In some examples, additional parameters on which the determination of the amount of fluid may be based at 620 may comprise for instance a weight of the container when empty, and/or a weight of the container when full, and/or a density of the fluid in the fluid container, and/or others.

In implementations, an example method 700 for determining the amount of fluid in a fluid container in a printing apparatus may comprise, at 710, monitoring the amount of fluid in the fluid container during operation of the printing apparatus, for example when a print job is being printed, or when a printer servicing operation is being performed.

Monitoring the amount of fluid at 710 may be performed by obtaining at 720 measurements with the strain gauge of the strain at the web of the U-shaped bracket, and determining, at 730, corresponding amounts of fluid in the fluid container. Such measurements and determinations may be successively performed: e.g., at 740, a predetermined time interval may lapse, or an event may occur, between one measurement at 720 and corresponding determination at 730, and a subsequent measurement at 720 and corresponding determination at 730.

Example method 700 may also comprise, at 750, triggering an action when a determined amount of fluid is above or below a predetermined threshold. For instance, an action triggered at 750 may comprise one or more of: issuing a warning that the fluid container has a low level of fluid; issuing a warning that the fluid container is to be replaced; storing data related to the printing or servicing operation and the determined amounts of fluid in the fluid container; or other.

In implementation of methods for determining or for monitoring the amount of fluid in a fluid container from the readings of the strain gauges, a zero point may be determined, i.e., a value of the readings for which there is no fluid in the fluid container; this allows obtaining measures of absolute values of the amount of fluid in the container (e.g. instead of obtaining values of relative decreases of the amount). For example, when the fluid container is empty, the strain on the gauges is caused by the weight of the ink container itself and of the support of the fluid container. In some examples, this may be considered the zero point.

In some implementations, the zero point may be determined by a statistical study of the strain registered when the container is empty: the statistical normal of the reading for this strain may be obtained, and this value may be set as the zero point "empty".

In some implementations, the reading obtained for the total weight of a new fluid container, full of fluid, may be set as a zero point "full": decreases of the readings are registered as fluid is consumed, from 0 g down to e.g. minus 1000 g (−1000 g) for a 1 liter container; in implementations, a correction may be introduced in the calculation to take into account the specific gravity of the fluid in relation to water.

FIGS. 8*a*, 8*b* and 8*c* are diagrams of example sensor bridges 800*a*, 800*b*, 800*c*, according to three different example Wheatstone bridge topologies, in which gauge strains 30 may be connected to provide a measure of the strain on the web 101 or 201 of the bracket 100 or 200.

In examples, the variable resistance R(ϵ) of a strain gauge 30 has a behavior modelled by equation (1), where ϵ is the applied strain, GF is a Gauge Factor GF characteristic of the strain gauge, and $R_s$ is the strain gauge nominal resistance, when ϵ=0:

$$R(\epsilon) = R_S + \Delta R(\epsilon) = R_S + GF \cdot \epsilon \quad (1)$$

In the example of FIG. 8*a*, one strain gauge 30 attached to the web of the bracket may be connected in a quarter-bridge topology sensor bridge 800*a*.

In the example of FIG. 8*b*, two strain gauges 30 attached to the web of the bracket may be connected in a half-bridge topology sensor bridge 800*b*, e.g. in side by side position as shown.

In the example of FIG. 8*c*, four strain gauges 30 attached to the web of the bracket may be connected in a full-bridge topology sensor bridge 800*c*.

Example sensor bridge 800*b*, and especially example sensor bridge 800*c*, may provide more resolution, and therefore more accuracy in the readings, as well as better temperature compensation, i.e., a lower variation of the readings with changes in the temperature, than example sensor bridge 800*a*.

For example, in sensor bridge 800*c* with four strain gauges, in some examples positioned two on each side of the web as described above, the four resistors of the bridge 800*c* are at substantially the same temperature of operation.

In each case, an excitation voltage $V_{cc}$ may be applied to the sensor bridge 800*a*, 800*b* or 800*c*, for example 3.3 V or 5 V, and an output voltage $V_o$ is obtained, e.g. in the range of millivolts, which is a function of the applied strain ϵ, i.e. the strain to which the web of the bracket is subject.

In examples, sensor bridges 800*a*, 800*b*, 800*c* convert the variable resistance R(ϵ) to an output voltage $V_o(\epsilon)$ according to equation (2), where $V_{cc}$ is the applied excitation voltage, and k is a constant depending on the topology of the sensor bridge, which assuming $\Delta R(\epsilon) << R_s$ and for balanced bridge conditions, is k=¼, k=½, and k=1 for sensor bridges 800*a*, 800*b* and 800*c*, respectively:

$$V_o(\epsilon) = k \cdot \Delta R(\epsilon) \cdot Vcc = k \cdot GF \cdot \epsilon \cdot V_{cc} \quad (2)$$

The output voltage $V_o$ may therefore be used to determine the weight of the fluid container causing the strain, and the corresponding amount or level of fluid in the fluid container. In other words, a relationship may be established between the output voltage $V_o$ of the sensor bridge 800*a*, 800*b* or 800*c*, and the amount of fluid in the fluid container.

Figure 2:
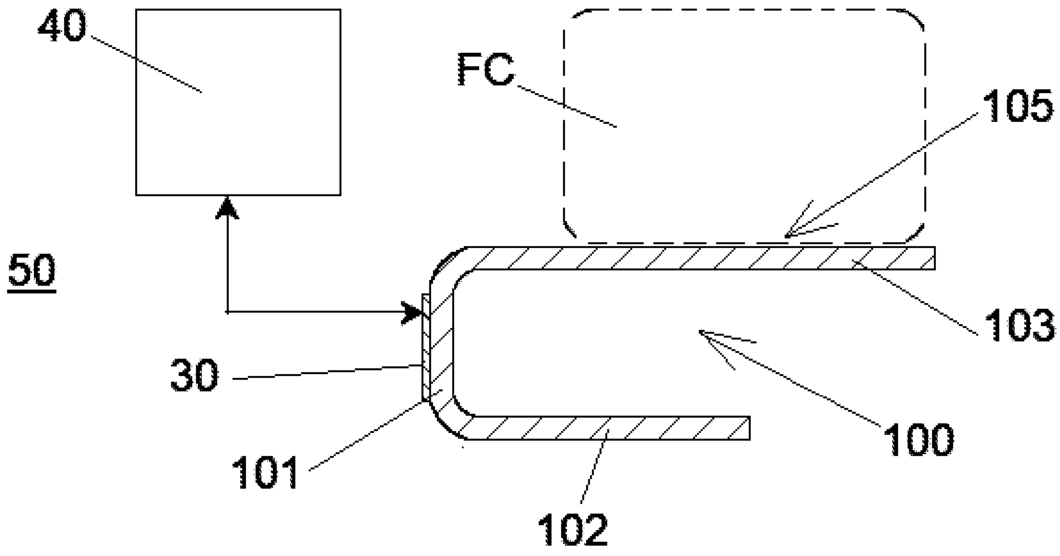
FIG. 2 shows in schematic view an example fluid level sensor, according to implementations disclosed herein.

In some implementations, the output of the sensor bridge 800*a*, 800*b* or 800*c* may be fed to a controller, such as controller 40 of FIG. 2 (not shown in FIGS. 8*a*, 8*b*, 8*c*), to determine the amount of fluid in the fluid container, based on $V_o$ and, in some examples, on data related to the fluid container (e.g. the weight of the fluid container when full and/or when empty), and/or the density of the fluid, and/or other parameters.

In some examples, in a support 100 for a fluid container, such as shown in FIG. 1 or 2, comprising e.g. one, two or four strain gauges 30 on the web 101, e.g. attached on the outer side of the web 101, the strain gauges 30 may be connected to a sensor bridge such as 800*a*, 800*b* or 800*c*, and the output voltage $V_o(\epsilon)$ of the sensor bridge may be fed to controller 40. In examples, the controller 40 may determine the amount of fluid as foreseen at 520, 620 or 730 of respective example methods 500, 600 or 700 disclosed above.

While such systems and methods may provide a determination of the amount of fluid that is suitable in some cases, there may be other cases, e.g. when there are small amounts of fluid in a fluid container, in which the strain sensed by the strain gauges 30 and its variation may be small, and therefore the magnitude and variation of the output voltage $V_o(\epsilon)$ may also be small, making it difficult to determine and monitor small amounts of fluid within the fluid container with a degree of accuracy that may be convenient for some applications.

On the other hand, since the output voltage $V_o(\epsilon)$ of sensor bridges 800*a*, 800*b* or 800*c* is related to the amount of strain applied to the strain gauge 30, this output voltage should be zero when no strain is applied to the strain gauge 30, and equation (2) is based on this assumption. However, in practice, due to component tolerances, resistance of the various elements such as e.g. wires, as well as aging, temperature, etc., the voltage output when no strain is applied may be different from zero. This non-zero output voltage when the applied strain ϵ is zero, which may be referred to as bridge offset voltage $V_{off,bridge}$, may be relevant to the determination of the amount of fluid, for instance, when the amount of fluid in the fluid container is very small, as $V_{off,bridge}$ may be of a magnitude similar to small variations of $V_o(\epsilon)$ due to variations in the amount of fluid in the fluid container.

In examples, the output voltage $V_o(\epsilon)$ of sensor bridges 800*a*, 800*b* or 800*c* may therefore be modelled by equation (3), which includes the offset voltage $V_{off,bridge}$ of the sensor bridges:

$$V_o(\epsilon) = V_{off,bridge} + k \cdot GF \cdot \epsilon \cdot Vcc \quad (3)$$

However, $V_{off,bridge}$ is not easily compensated at the output of the sensor bridges 8900*a*, 800*b*, 800*c*, because of the difficulty of generating such small voltages with common Digital to Analog Converters (DAC).

In order to provide a more accurate and reliable determination of the fluid amount, according to some implementations the output voltage $V_o(\epsilon)$ signal may be processed in an example measuring system, which may amplify the sensor bridge output voltage $V_o(\epsilon)$ and also take into account the effect of the bridge offset voltage $V_{off,bridge}$ in the measurements.

Implementations of measuring systems, which comprise an example sensor bridge such as 800*a*, 800*b* or 800*c*, are described in the following with reference to FIGS. 9 and 10. Implementations of example measuring systems disclosed in the following may be provided in combination with any of the example supports and/or example level sensors and/or example methods disclosed and claimed herein.

FIG. 9 illustrates implementations of a measuring system 900 which may comprise a sensor circuit 901, such as for example one of sensor bridges 800*a*, 800*b* or 800*c* disclosed above, providing the output voltage $V_o(\epsilon)$ depending on the strain ϵ applied to the strain gauges 30, and including a bridge offset voltage $V_{off,bridge}$. The output voltage $V_o(\epsilon)$ of sensor circuit 901 may be fed to an amplifying circuit 902, which will issue an amplified signal, in which $V_{off,bridge}$ is also amplified.

In implementations of the measuring system 900, a correction circuit 903 may apply a dynamic correction to the amplified signal before it is converted to a digital signal in an ADC (Analog to Digital Converter) 904, in order to avoid a saturation of the ADC 904.

An example numerical case is presented in the following to illustrate how saturation may occur. In such an example, the signal $V_o$ may be a differential signal, e.g. ranging from −0.5 mV and +0.5 mV, and the ADC 904 input may work between e.g. 0 V and 1 V. In such case, the amplifying circuit 902 would be designed to maximize the range of the ADC input, i.e. applying an amplification offset, e.g. $V_{off,amp}$=+0.5 V, and subsequently amplifying the signal with a gain of e.g. 1000, thus fitting the $V_o$ signal to the full resolution of the ADC. However, $V_o$ in practice also includes a bridge offset voltage $V_{off,bridge}$: if, for example, there is a $V_{off,bridge}$=+0.6 mV, then $V_o$ may range from +0.1 mV to +1.1 mV, so in practice the output of the amplifier may be a signal ranging from 0.1 V to 1.1 V (resulting from adding $V_{off,amp}$=+0.5 V and applying the gain). If such a signal is fed to the ADC, it would saturate the converter, which has a maximum input voltage of 1 V. The resulting digital signal may therefore be incorrect.

To prevent such a saturation of the ADC 904, the dynamic correction applied to the amplified signal by correction circuit 903 may take into account the range of the amplified signal, which includes the part of the signal due to the bridge offset voltage $V_{off,bridge}$ and varies over time, in such a way that the signal inputted into the converter 904 fits a resolution of the converter 904 over time, and an accurate digitalized measurement of $V_o(\epsilon)$ may be obtained.

The bridge offset voltage $V_{off,bridge}$ may be obtained by a closed loop calibration of the measurement system 900, performed at a time when there is no strain applied on the strain gauges 30, e.g. during a fluid container replacement operation.

As shown in FIG. 9, the ADC 904 and the correction circuit 903 may be connected to a controller 905, which controls the measuring system 900, and in some implementations may also correlate the signal obtained from the measuring system 900 to the fluid level or fluid amount in the fluid container.

In some examples, the amplifying circuit 902 may comprise an Indirect Current Feedback (ICF) amplifier, which may avoid saturation of the output of the amplifying circuit 902, while maximizing the use of the resolution of the ADC 903, using the highest resolution available for the amplified signal.

FIG. 10 illustrates implementations of a measuring system 950 which in some examples may comprise a Front-End analog electronic circuit 951, which converts the variable resistance R(ϵ) to a voltage $V_{in,ADC}$ to be converted to a digital signal; and a microcontroller unit (MCU) 952.

The Front-End analog electronic circuit 951 may comprise a sensor bridge 953, e.g. one of sensor bridges 800*a*, 800*b* or 800*c* described above; an output offset generation circuit 954; and an ICF (Indirect Current Feedback) amplifier 955.

The microcontroller unit (MCU) 952 may comprise an analog-to-digital converter (ADC) 956 to convert the voltage related to the measured strain E to a digital signal; a digital-to-analog converter (DAC) 957; and a CPU 958 for digital processing with data acquired through the ADC 956, and for control of the DAC 957.

The output offset generation circuit 954 generates a fixed voltage $V_{off,amp}$ which is employed as an output voltage reference of the ICF amplifier 955 to accommodate the ADC input voltage to a dynamic voltage range of the ADC 956. The ICF amplifier 955 amplifies the differential output voltage $V_o$ of the sensor bridge 953, and sets the output voltage for zero-load conditions (ϵ=0) according to the fixed voltage $V_{off,amp}$ and the variable voltage $V_{DAC}$, thus being able to dynamically compensate non-desired effects in the sensing application. The voltage being inputted to the ADC can be computed as expressed in equation (4):

$$V_{in,ADC}(\epsilon) = V_{off,amp} + A_v V_o(\epsilon) + A_{v,DAC}(V_{off,amp} - V_{DAC}) \tag{4}$$

In equation (4), $A_v$ is the voltage gain, and depends on external resistor ratio as specified in equation (5), and $A_{v,DAC}$ is the voltage gain on the compensation voltage and depends on external resistor ratio as specified in equation (6):

$$A_v = 1 + R_2/R_1 + R_2/R_A \tag{5}$$

$$A_{v,DAC} = 1 + R_2/R_A \tag{6}$$

The digital-to-analog converter (DAC) 957 generates a voltage $V_{DAC}$ for dynamic compensation of the sensing application. For this compensation, this voltage aims to set $V_{in,ADC}(\epsilon=0)=V_{off,amp}$.

To achieve this, $V_{DAC}$ is set according to equation (7):

$$V_{in,ADC}(\epsilon = 0) = V_{off,amp} + A_v V_{off,bridge} + A_{v,DAC}(V_{off,amp} - V_{DAC}) = V_{off,amp} \rightarrow V_{DAC} = V_{off,amp} + (A_v/A_{v,DAC})V_{off,bridge} \tag{7}$$

In order to set $V_{DAC}$, a close-loop calibration process may be performed, prior to the regular operation of the measurement system 950, to obtain the value of $V_{off,bridge}$.

The process to obtain $V_{off,bridge}$ and set $V_{DAC}$ may be performed e.g. every time a fluid container is replaced, to take into account the variation that $V_{off,bridge}$ may have in time, and therefore obtain more accurate estimates of the amount of fluid in the fluid container.

Although a number of particular implementations and examples have been disclosed herein, other variants and modifications of the disclosed devices and methods are possible. For example, not all the features disclosed herein are included in all the implementations, and implementations comprising other combinations of the features described are also possible.

The invention claimed is:

1. A support for a fluid container for a printing apparatus, the support comprising:

a bracket comprising a U-shaped cross section, the bracket comprising:

a mounting portion for attaching the bracket to a printing apparatus, and a bearing portion for attaching a fluid container to the bracket; and a strain gauge attached on a web of the U-shaped cross section of the bracket, between the mounting portion and the bearing portion.

2. A support according to claim 1, the strain gauge being attached to the bracket on the outer surface of the web of the U-shaped cross section.

3. A support according to claim 1, comprising two strain gauges attached to the web of the bracket, the two strain gauges being spaced apart from each other along the web of the bracket, and placed symmetrically with respect to the centre of the web.

4. A support according to claim 1, comprising four strain gauges, two strain gauges being attached to the outer surface of the web of the bracket, and two strain gauges being attached to the inner surface of the web of the bracket.

5. A support according to claim 1, the strain gauge being a foil strain gauge comprising a plurality of thin parallel tracks, and the foil strain gauge being oriented on the web of the bracket with the parallel tracks extending in a direction perpendicular to a width direction of the web.

6. A support according to claim 1, the bracket being an integral part formed by a bent metal sheet.

7. A support according to claim 1, the distance between the bearing portion and the web of the bracket being greater than the distance between the mounting portion and the web.

8. A fluid level sensor, comprising a bracket with a U-shaped cross section formed by two wings and a web between the two wings, one of the wings comprising a bearing portion for attaching a fluid container to the bracket, a strain sensor attached to the web of the bracket to sense a strain of the web caused by a weight of a fluid container attached to the bearing portion, and a controller to correlate the strain of the web to a fluid level in the fluid container.

9. A method for determining the amount of fluid in a fluid container in a printing apparatus, comprising:

measuring with a strain gauge a strain occurring at the web of a U-shaped bracket, the U shaped bracket having a first wing for attachment to a printing apparatus and a second wing for carrying a fluid container, the strain gauge being attached to the web of the U-shaped bracket; and determining the amount of fluid in the fluid container based on the strain measured with the strain gauge.

10. A method according to claim 9, comprising determining the amount of fluid in the fluid container based also on parameters related to at least one of the fluid container and the fluid in the fluid container.

11. A method according to claim 9, comprising monitoring the amount of fluid in the fluid container during operation of the printing apparatus by obtaining successive measurements with the strain gauge of the strain at the web of the U-shaped bracket, and determining corresponding amounts of fluid in the fluid container.

12. A method according to claim 11, comprising triggering an action when an amount of fluid determined is above or below a predetermined threshold.

13. A method according to claim 9, wherein determining the amount of fluid in the fluid container comprises:

connecting one or more strain gauges in a sensor bridge with a topology selected from a quarter-bridge topology, a half-bridge topology and a full-bridge topology;

obtaining an output voltage of the sensor bridge; and determining the amount of fluid in the fluid container based on the output voltage of the sensor bridge.

14. A method according to claim 9, wherein determining the amount of fluid in the fluid container comprises:

connecting one or more strain gauges in a sensor bridge with a topology selected from a quarter-bridge topology, a half-bridge topology and a full-bridge topology;

obtaining an output voltage of the sensor bridge;

amplifying the output voltage and applying a correction to the amplified output voltage to compensate an offset voltage of the sensor bridge; and converting the amplified and corrected voltage to a digital signal.

15. A method according to claim 14, comprising determining the offset voltage of the sensor bridge by performing a calibration when there is no container attached to the U-shaped bracket.

* * * * *